(12) United States Patent
Liu

(10) Patent No.: US 9,959,729 B2
(45) Date of Patent: May 1, 2018

(54) ALARMING METHOD AND DEVICE

(71) Applicant: BEIJING ZHIGU TECH CO., LTD., Beijing (CN)

(72) Inventor: Jia Liu, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 0 days. days.

(21) Appl. No.: 15/505,294

(22) PCT Filed: Aug. 26, 2015

(86) PCT No.: PCT/CN2015/088081
§ 371 (c)(1),
(2) Date: Feb. 21, 2017

(87) PCT Pub. No.: WO2016/029846
PCT Pub. Date: Mar. 3, 2016

(65) Prior Publication Data
US 2017/0270762 A1 Sep. 21, 2017

(30) Foreign Application Priority Data
Aug. 26, 2014 (CN) .......................... 2014 1 0426344

(51) Int. Cl.
*G08B 21/00* (2006.01)
*G08B 21/02* (2006.01)
(Continued)

(52) U.S. Cl.
CPC ............. *G08B 21/02* (2013.01); *H04B 17/23* (2015.01); *H04B 17/318* (2015.01)

(58) Field of Classification Search
CPC ...... H04R 2420/01; G08B 21/02; H04M 1/05
(Continued)

(56) References Cited

U.S. PATENT DOCUMENTS 6,639,512 B1 10/2003 Lee
6,782,106 B1 8/2004 Kong
(Continued)

FOREIGN PATENT DOCUMENTS

CN 1886765 A 12/2006
CN 101178857 A 5/2008
(Continued)

OTHER PUBLICATIONS

International Search Report and Written Opinion for Application No. PCT/CN2015/088081, dated Nov. 20, 2015, 8 pages.

*Primary Examiner* — Fabricio R Murillo Garcia

(57) ABSTRACT

This application provides an alarming method and device, and relates to the field of communications. The method includes: obtaining a power of an audio signal; determining a transmit power value at least according to the power of the audio signal; broadcasting detection information according to the transmit power value, the detection information including the transmit power value; and alarming, in response to receiving alarming information fed back by another device according to the detection information, a user according to the alarming information. According to the method and device, a user is alarmed in time in a situation in which a risk may occur, and meanwhile an undesired effect of an environmental noise on the user listening to the audio signal in a safe situation is also avoided, thereby improving user experience.

20 Claims, 5 Drawing Sheets

(51) Int. Cl.
  *H04B 17/23*  (2015.01)
  *H04B 17/318*  (2015.01)

(58) Field of Classification Search
  USPC .......................................... 340/540
  See application file for complete search history.

(56) References Cited

U.S. PATENT DOCUMENTS

| | | | |
|---|---|---|---|
| 7,903,826 B2 | 3/2011 | Boersma | |
| 2009/0161893 A1* | 6/2009 | Hironaka | ............ H04M 1/6066 |
| | | | 381/151 |
| 2013/0329904 A1* | 12/2013 | Meritt | ...................... H04R 3/00 |
| | | | 381/74 |
| 2014/0003619 A1* | 1/2014 | Sannie | ..................... H04R 3/12 |
| | | | 381/81 |

FOREIGN PATENT DOCUMENTS

| | | |
|---|---|---|
| CN | 101203059 A | 6/2008 |
| CN | 202551297 U | 11/2012 |
| CN | 103118173 A | 5/2013 |
| CN | 103765941 A | 4/2014 |
| CN | 104157108 A | 11/2014 |
| JP | 2001-175986 A | 6/2001 |
| JP | 2006-210976 A | 8/2006 |
| JP | 2012-248964 A | 12/2012 |
| KR | 10-2010-0024594 A | 3/2010 |
| WO | 2009/152554 A1 | 12/2009 |
| WO | 2011/133195 A1 | 10/2011 |

\* cited by examiner

ALARMING METHOD AND DEVICE

RELATED APPLICATION

The present application is a 371 National Phase of International Patent Application No. PCT/CN2015/088081, filed on Aug. 26, 2015, which claims the benefit of priority to Chinese Patent Application No. 201410426344.9, filed on Aug. 26, 2014, and entitled "Alarming Method and Device," each of which is incorporated herein by reference in its entirety.

TECHNICAL FIELD

This application relates to the field of communications, and more particularly, to an alarming method and device.

BACKGROUND

In recent years, with the development of electronic devices, smartphones, tablet computers, MP3 players and the like gradually enter lives of people, and greatly enrich and facilitate the lives of the people. Some users like using an electronic device to listen to music during walking, bicycling, and/or driving, which can tremendously increases the risk of causing a traffic accident. Particularly, when a user wears an earphone to listen to music, if the volume of the music is large, it is prone to cause a risk because the user may ignore an external sound.

For the foregoing problem, some practices are as follows: an external sound is collected, the external sound and music are superposed, and then played to a user, and the user determines whether a risk exists. A disadvantage of this type of practices lies in that, the user is affected by an environmental noise while listening to the music, and thus user experience is not good.

SUMMARY

An objective of this application is to provide an alarming method and device.

According to an aspect of at least one embodiment of this application, an alarming method is provided, wherein the method may include:

obtaining a power of an audio signal;
determining a transmit power value at least according to the power of the audio signal;
broadcasting detection information according to the transmit power value, the detection information including the transmit power value; and
alarming, in response to receiving alarming information fed back by another device according to the detection information, a user according to the alarming information.

According to an aspect of at least one embodiment of this application, an alarming device is provided, where the device may include:

an obtaining module, configured to obtain a power of an audio signal;
a first determining module, configured to determine a transmit power value at least according to the power of the audio signal;
a broadcast module, configured to broadcast detection information according to the transmit power value, the detection information including the transmit power value; and
an alarming module, configured to alarm, in response to receiving alarming information fed back by another device according to the detection information, a user according to the alarming information.

In the embodiments of this application, a power of an audio signal is obtained, a transmit power value is determined at least according to the power of the audio signal, detection information is broadcasted according to the transmit power value, and then a user is alarmed in a situation in which alarming information fed back by another device according to the detection information is received, thereby alarming the user in time in a situation in which a risk may occur, and meanwhile also avoiding an undesired effect of an environmental noise on the user listening to the audio signal in a safe situation, and improving user experience.

DETAILED DESCRIPTION

The description of this application is further described in detail hereinafter with reference to the accompanying drawings and embodiments. The following embodiments are used to describe this application, but not used to limit the scope of this application.

A person skilled in the art should understand that, in the embodiments of this application, the value of the sequence number of each step does not indicate an execution order, and the execution order of the steps should be determined according to a function and an inherent logic thereof, and should not form any limit to the implementation process of the embodiments of this application.

Figure 1:
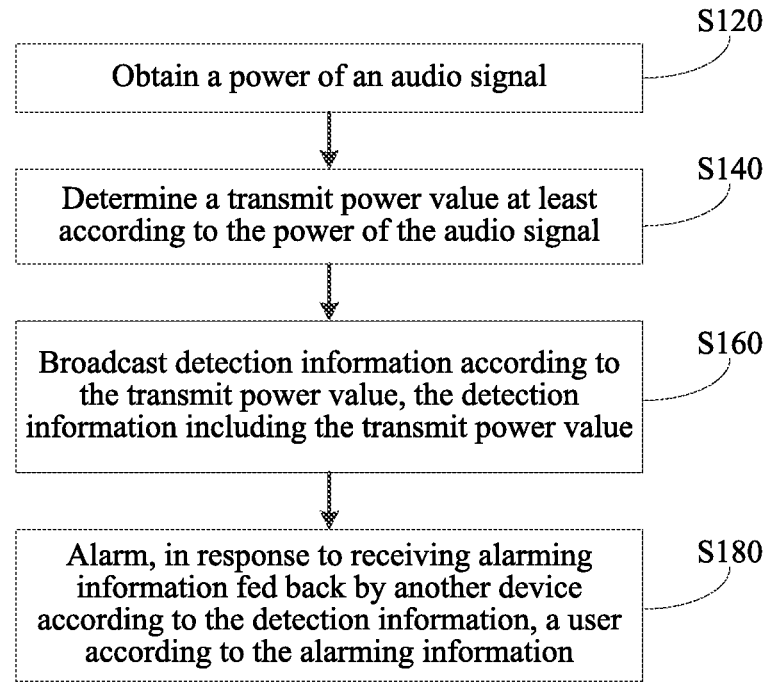
FIG. 1 is a flowchart of an alarming method according to an embodiment of this application.

FIG. 1 is a flowchart of an alarming method according to an embodiment of this application, and the method may be implemented on, for example, an alarming device. As shown in FIG. 1, the method includes:

S120: Obtain a power of an audio signal.
S140: Determine a transmit power value at least according to the power of the audio signal.
S160: Broadcast detection information according to the transmit power value, the detection information including the transmit power value.

S180: Alarm, in response to receiving alarming information fed back by another device according to the detection information, a user according to the alarming information.

In the method of this embodiment of this application, a power of an audio signal is obtained, a transmit power value is determined at least according to the power of the audio signal, detection information is broadcasted according to the transmit power value, and then a user is alarmed in a situation in which alarming information fed back by another device according to the detection information is received, thereby alarming the user in time in a situation in which a risk may exist, and also avoiding an undesired effect of an environmental noise on the user listening to the audio signal in a safe situation, and improving user experience.

Functions of steps S120, S140, S160 and S180 are described in detail below with reference to exemplary implementation manners.

S120: Obtain a power of an audio signal.

The audio signal may be any audio signal to which a user pays attention, such as music or broadcast to which the user is listening. In this step, the audio signal may be collected by using a microphone and then a power thereof is determined, and the power thereof may also be directly obtained from an output device of the audio signal. For example, when the user listens to music played by a smartphone by using an earphone, a power of the music may be directly obtained from the smartphone.

S140: Determine a transmit power value at least according to the power of the audio signal.

The higher the power of the audio signal is, the larger the shielding effect on the user is, and the higher the probability that a traffic accident occurs to the user is. For example, when a power of an audio signal output by an earphone worn by a user reaches more than 60 dB, the user basically cannot hear an external sound. In this case, when, for example, an electric vehicle nearby the user approaches, the user may not be aware of it, which is prone to cause a traffic accident.

Therefore, in one embodiment, the transmit power value is in direct proportion to the power of the audio signal. That is, if the power of the audio signal to which the user pays attention is higher, the detection information is broadcasted at a higher transmit power value in step S160 below, so that another device in a larger range can receive the detection information.

Besides the power of the audio signal, the moving state of the user may also affect the probability that a traffic accident occurs to the user. The moving state of the user may include information such as a moving manner, a moving speed, and a moving direction of the user. The moving manner includes walking, bicycling, driving, and the like. Therefore, in one embodiment, step S140 may include: determining the transmit power value according to the power of the audio signal and a moving state of the user. For example, a transmit power value corresponding to a situation in which the user walks may be greater than a transmit power value corresponding to a situation in which the user bicycles.

Additionally, the environment information may also affect the probability that a traffic accident occurs to the user, and the environment information may include a road condition and/or light brightness. Therefore, in another embodiment, step S140 may include: determining the transmit power value according to the power of the audio signal and environment information. For example, a transmit power value corresponding to a situation in which the user travels at night may be greater than a transmit power value corresponding to a situation in which the user travels in the daytime.

Certainly, a person skilled in the art understands that, the transmit power value may be further determined according to the power of the audio signal, the moving state of the user and the environment information.

In one embodiment, in consideration of energy conservation, step S140 may be started only in a situation in which the power of the audio signal is large and may affect safety of the user, step S140 may further include:

S140': Determine, in response to that the power of the audio signal is greater than a first threshold, the transmit power value at least according to the power.

The first threshold may be, for example, 60 dB.

S160: Broadcast detection information according to the transmit power value, the detection information including the transmit power value.

In this step, the detection information may be broadcasted in a manner, such as, for example, Bluetooth, Zigbee, Wifi, infrared, microwave, or ultrasonic wave. As described above, if the transmit power value is larger, another device in a larger range may receive the detection information; if the transmit power value is smaller, another device in a smaller range may receive the detection information. Therefore, another device in a predetermined range may be allowed to receive the detection information by changing the magnitude of the transmit power value.

The detection information includes the transmit power value, so that the another device receiving the detection information may perform calculation to determine and/or obtain a distance between the another device and the user, and then determines whether a risk exists.

S180: Alarm, in response to receiving alarming information fed back by another device according to the detection information, a user according to the alarming information.

The another device is an electronic device in a predetermined range relative to the user, such as, for example, a smartphone in a range taking the user as a circle center and having a radius of 10 meters. The predetermined range may be determined according to the transmit power value.

After receiving the detection information, the another device may perform calculation to obtain a distance between the another device and the user according to the transmit power value and a received signal power, and then compares the distance with a predetermined distance (such as 2 meters). If the distance is less than the predetermined distance, it is considered that a risk exists, and alarming information may be fed back to the device and/or the user.

In the method, the user may be alarmed in a manner of sound, vibration, lamp light, and/or text according to the alarming information, so as to prompt the user to pay attention to traffic safety.

Figure 2:
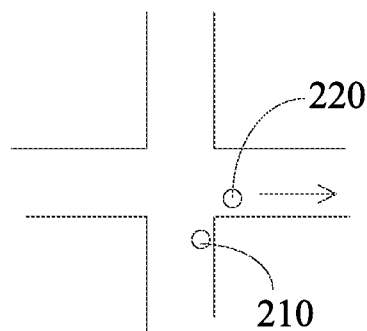
FIG. 2 is a schematic diagram of an application scenario of an alarming method according to an embodiment of this application.

In one embodiment, the detection information further includes location information of the user, and the another device may more accurately evaluate whether a risk of colliding with the user exists according to the location information. For example, at the crossroads shown in FIG. 2, after a smartphone of a first user 210 broadcasts the detection information, a smartphone of a second user 220 receives the detection information, calculation may be performed by the smartphone of second user 220 according to the detection information to obtain that a distance between the two is less than a safety distance, but it may be determined according to location information of the first user 210 and a moving direction of the second user 220 (a direction shown by an arrow in FIG. 2) that the two will not collide, and therefore, and alarming information does not need to be fed back to the smartphone of the first user 210, and thereby false alarms may be reduced.

Figure 3:
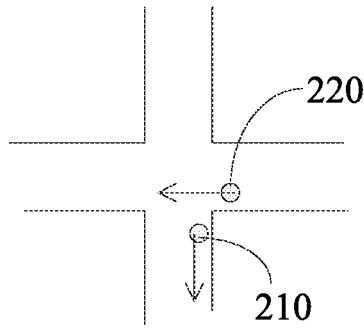
FIG. 3 is a schematic diagram of an application scenario of an alarming method according to another embodiment of this application.

In one embodiment, the detection information further includes a moving state of the user, and the another device may more accurately evaluate whether a risk of colliding with the user exists according to the moving state. For example, at the crossroads shown in FIG. 3, after a smartphone of a first user 210 broadcasts the detection information, a smartphone of a second user 220 receives the detection information, calculation may be performed by the smartphone of second user 220 according to the detection information to obtain that a distance between the two is less than a safety distance, but it may be determined according to a moving direction of the first user 210 (a direction shown by a vertical arrow in FIG. 2) and a moving direction of the second user 220 (a direction shown by a horizontal arrow in FIG. 2) that the two will not collide, and therefore, and alarming information does not need to be fed back to the smartphone of the first user 210, and thereby false alarms may be reduced.

Certainly, a person skilled in the art understand, the detection information may further include both the location information of the user and the moving state of the user, so as to further help the another device more accurately evaluate whether a risk of colliding with the user exists.

Similarly, the alarming information may further include the location information of the another device and/or the moving state of the another device, and therefore, after receiving the alarming information, the user may further determine autonomously whether the user needs to dodge according to the location information of the another device and/or the moving state of the another device.

Figure 4:
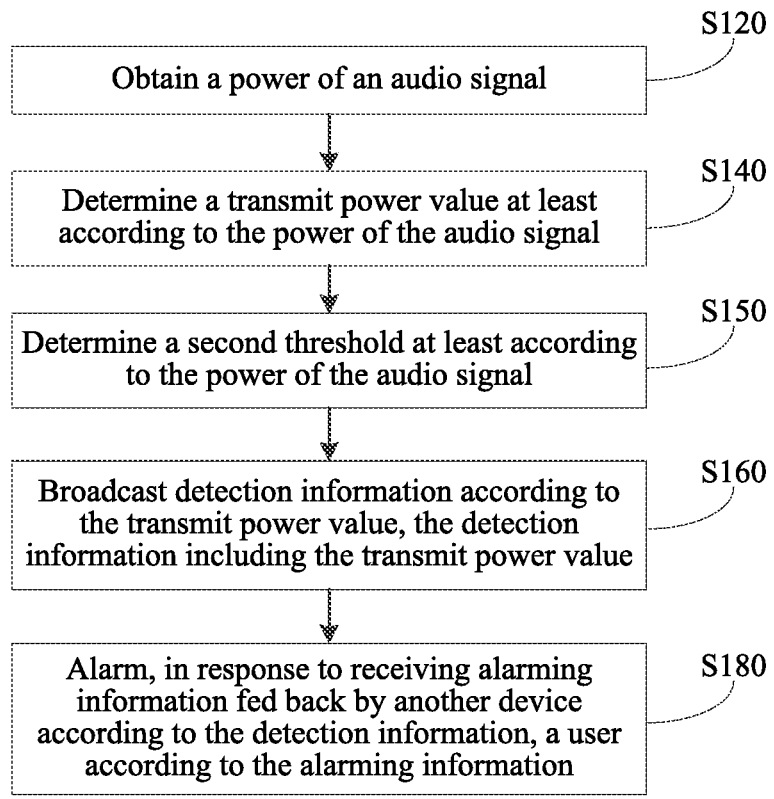
FIG. 4 is a flowchart of an alarming method according to an embodiment of this application.

As shown in FIG. 4, in one embodiment, the method further includes:

S150: Determine a second threshold at least according to the power of the audio signal.

The second threshold may be a reference power value or a reference distance value.

In a situation in which the second threshold is a reference power value, the another device may compare a received signal power obtained at the time of receiving the detection information with the reference power value, and if the received signal power is greater than the reference power value, it indicates that a distance between the another device and the user is less than a safety distance, and alarming information needs to be fed back; otherwise, alarming information does not need to be fed back.

In a situation in which the second threshold is a reference distance value, the another device may perform calculation according to a received signal power obtained at the time of receiving the detection information and the transmit power value to obtain a distance between the another device and the user, and if the distance is less than the reference distance value, it indicates that a distance between the another device and the user is less than a safety distance, and alarming information needs to be fed back; otherwise, alarming information does not need to be fed back.

The detection information may include the second threshold, so that the another device may determine whether a collision risk may exist according to a standard set by the user rather than a standard of the another device or another user. For example, in a situation in which the user is unable to move freely, the user may intend to keep a distance from a vehicle on a road greater than that at ordinary times, and in this case, the user may set the second threshold to a reference distance value greater than that at ordinary times.

Figure 5:
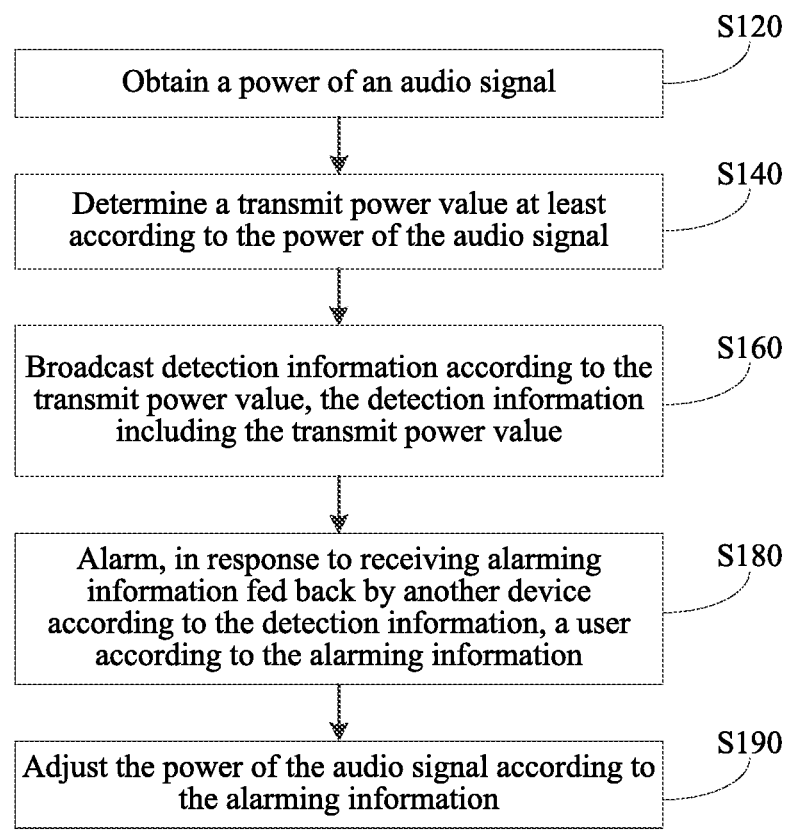
FIG. 5 is a flowchart of an alarming method according to another embodiment of this application.

As shown in FIG. 5, in one embodiment, the method may further include:

S190: Adjust the power of the audio signal according to the alarming information.

After receiving the alarming information, the user generally intends to turn off, and/or lower the audio signal, so as to help the user obtain information about an external sound in time. By implementing this step, operation of such behaviors of the user may be omitted, and operation time of the user in response to the alarming information may be reduced, so that the user has time and capacity to dodge a risk in time.

Moreover, an embodiment of this application further provides a computer readable medium, including computer readable instructions for performing the following operations when being executed: operations of performing steps S120, S140, S160 and S180 of the method in the exemplary embodiment shown in FIG. 1.

To sum up, in the method of this embodiment of this application, a user is alarmed in time in a situation in which a risk may exist, an undesired effect of an environmental noise on the user listening to the audio signal in a safe situation is also avoided, and false alarms may be reduced with reference to the location information and the moving state of the user, and the power of the audio signal is adjusted according to the alarming information, thereby improving user experience.

Figure 6:
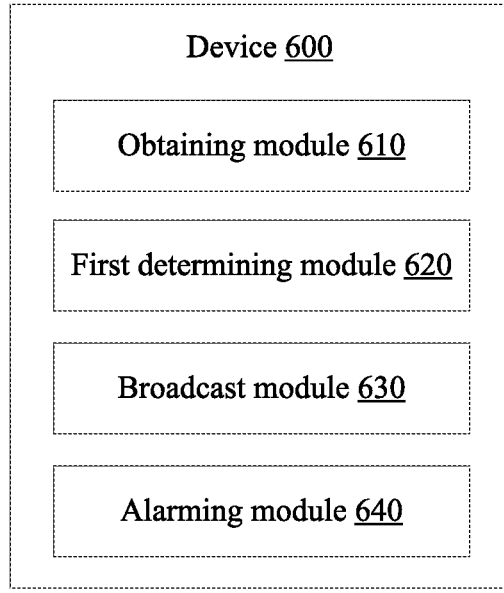
FIG. 6 is a schematic diagram of a modular structure of an alarming device according to an embodiment of this application.

FIG. 6 is a schematic diagram of a modular structure of an alarming device according to an embodiment of this application. The alarming device may be a device such as a smartphone, a tablet computer, or an MP3 player, and the alarming device is generally an audio playback device having a music playback or broadcast listening function. As shown in FIG. 6, the device 600 may include:

an obtaining module 610, configured to obtain a power of an audio signal;

a first determining module 620, configured to determine a transmit power value at least according to the power of the audio signal;

a broadcast module 630, configured to broadcast detection information according to the transmit power value, the detection information including the transmit power value; and an alarming module 640, configured to alarm, in response to receiving alarming information fed back by another device according to the detection information, a user according to the alarming information.

The device of this embodiment of this application obtains a power of an audio signal, determines a transmit power value at least according to the power of the audio signal, broadcasts detection information according to the transmit power value, and then alarms a user in a situation in which alarming information fed back by another device according to the detection information is received, thereby alarming the user in time in a situation in which a risk may exist, and also avoiding an undesired effect of an environmental noise on the user listening to the audio signal in a safe situation, and improving user experience.

Functions of the obtaining module 610, the first determining module 620, the broadcast module 630 and the alarming module 640 are described in detail below with reference to exemplary embodiments.

The obtaining module 610 is configured to obtain a power of an audio signal.

The audio signal may be an audio signal to which a user pays attention, such as music or broadcast to which the user is listening. In this step, the obtaining module 610 may collect the audio signal by using a microphone and then determine a power thereof, and may also directly obtain the power thereof from an output device of the audio signal. For example, when the user listens to music played by a smartphone by using an earphone, a power of the music may be directly obtained from the smartphone.

The first determining module 620 is configured to determine a transmit power value at least according to the power of the audio signal.

The higher the power of the audio signal is, the larger a shielding effect on the user is, and the higher the probability that a traffic accident occurs to the user is. For example, when a power of an audio signal output by an earphone worn by a user reaches more than 60 dB, the user basically cannot hear an external sound. In this case, when an electric vehicle nearby the user approaches, the user may not be aware of it, which is prone to cause a traffic accident.

Therefore, in one embodiment, the transmit power value is in direct proportion to the power of the audio signal. That is, if the power of the audio signal to which the user pays attention is higher, the broadcast module 630 broadcasts the detection information at a higher transmit power value, so that another device in a larger range can receive the detection information.

Besides the power of the audio signal, the moving state of the user may also affect the probability that a traffic accident occurs to the user. The moving state of the user may include information such as a moving manner, a moving speed, and a moving direction of the user. The moving manner includes walking, bicycling, driving and the like. Therefore, in one embodiment, the first determining module 620 is configured to determine the transmit power value according to the power of the audio signal and a moving state of the user. For example, a transmit power value corresponding to a situation in which the user walks may be greater than a transmit power value corresponding to a situation in which the user bicycles.

Additionally, the environment information may also affect the probability that a traffic accident occurs to the user, and the environment information may include a road condition and/or light brightness. Therefore, in another embodiment, the first determining module 620 is configured to determine the transmit power value according to the power of the audio signal and environment information. For example, a transmit power value corresponding to a situation in which the user travels at night may be greater than a transmit power value corresponding to a situation in which the user travels in the daytime.

Certainly, a person skilled in the art understands that, the first determining module 620 may further determine the transmit power value according to the power of the audio signal, the moving state of the user and the environment information.

In one embodiment, in consideration of energy conservation, the first determining module 620 may be started only in a situation in which the power of the audio signal is large and may affect safety of the user. For example, the first determining module 620 is configured to determine, in response to that the power of the audio signal is greater than a first threshold, the transmit power value at least according to the power of the audio signal.

The broadcast module 630 is configured to broadcast detection information according to the transmit power value, the detection information including the transmit power value.

The broadcast module 630 may broadcast the detection information in a manner such as Bluetooth, Zigbee, Wifi, or infrared. As described above, if the transmit power value is larger, another device in a larger range may receive the detection information; if the transmit power value is smaller, another device in a smaller range may receive the detection information. Therefore, another device in a predetermined range may be allowed to receive the detection information by changing the magnitude of the transmit power value.

The detection information includes the transmit power value, so that the another device receiving the detection information may perform calculation to obtain a distance between the another device and the user, and then determines whether a risk exists.

The alarming module 640 is configured to alarm, in response to receiving alarming information fed back by another device according to the detection information, a user according to the alarming information.

The another device is an electronic device in a predetermined range relative to the user, such as, for example, a smartphone in a range taking the user as a circle center and having a radius of 10 meters. The predetermined range may be determined according to the transmit power value.

After receiving the detection information, the another device may perform calculation to obtain a distance between the another device and the user according to the transmit power value and a received signal power, and then compares the distance with a predetermined distance (such as 2 meters). If the distance is less than the predetermined distance, it is considered that a risk exists, and alarming information may be fed back.

The alarming module 640 may alarm the user in a manner of sound, vibration, lamp light, and/or text according to the alarming information, so as to prompt the user to pay attention to traffic safety.

In one embodiment, the detection information further includes location information of the user, and the another device may more accurately evaluate whether a risk of colliding with the user exists according to the location information. For example, at the crossroads shown in FIG. 2, after a smartphone (that is, the alarming device 600) of a first user 210 broadcasts the detection information, a smartphone of a second user 220 receives the detection information, calculation may be performed by the smartphone of second user 220 according to the detection information to obtain that a distance between the two is less than a safety distance, but it may be determined according to location information of the first user 210 and a moving direction of the second user 220 (a direction shown by an arrow in FIG. 2) that the two will not collide, and therefore, and alarming information does not need to be fed back to the smartphone of the first user 210, and thereby false alarms may be reduced.

In an implementation manner, the detection information further includes moving state of the user, and the another device may more accurately evaluate whether a risk of colliding with the user exists according to the moving state. For example, at the crossroads shown in FIG. 3, after a smartphone (that is, the alarming device 600) of a first user 210 broadcasts the detection information, a smartphone of a second user 220 receives the detection information, calculation may be performed by the smartphone of second user 220 according to the detection information to obtain that a distance between the two is less than a safety distance, but it may be determined according to a moving direction of the first user 210 (a direction shown by a vertical arrow in FIG. 2) and a moving direction of the second user 220 (a direction shown by a horizontal arrow in FIG. 2) that the two will not collide, and therefore, and alarming information does not need to be fed back to the smartphone of the first user 210, and thereby false alarms may be reduced.

Certainly, a person skilled in the art understand, the detection information may further include both the location information of the user and the moving state of the user, so as to further help the another device more accurately evaluate whether a risk of colliding with the user exists.

Similarly, the alarming information may further include the location information of the another device and/or the moving state of the another device, and therefore, after receiving the alarming information, the user may further determine autonomously whether the user needs to dodge according to the location information of the another device and/or the moving state of the another device.

Figure 7:
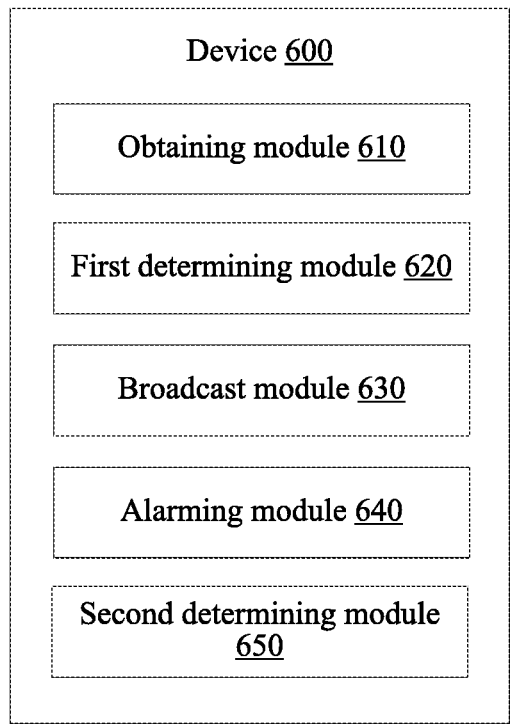
FIG. 7 is a schematic diagram of a modular structure of an alarming device according to an implementation manner of this application.

As shown in FIG. 7, in one embodiment, the device 600 may further include:

a second determining module 650, configured to determine a second threshold at least according to the power of the audio signal.

The second threshold may be a reference power value or a reference distance value. The detection information may include the second threshold, so that the another device may determine whether a collision risk may exist according to a standard set by the user.

In a situation in which the second threshold is a reference power value, the another device may compare a received signal power obtained at the time of receiving the detection information with the reference power value, and if the received signal power is greater than the reference power value, it indicates that a distance between the another device and the user is less than a safety distance, and alarming information needs to be fed back to the device and/or the user; otherwise, alarming information does not need to be fed back to the device and/or the user.

In a situation in which the second threshold is a reference distance value, the another device may perform calculation according to a received signal power obtained at the time of receiving the detection information and the transmit power value to obtain a distance between the another device and the user, and if the distance is less than the reference distance value, it indicates that a distance between the another device and the user is less than a safety distance, and alarming information needs to be fed back to the device and/or the user; otherwise, alarming information does not need to be fed back to the device and/or the user.

Figure 8:
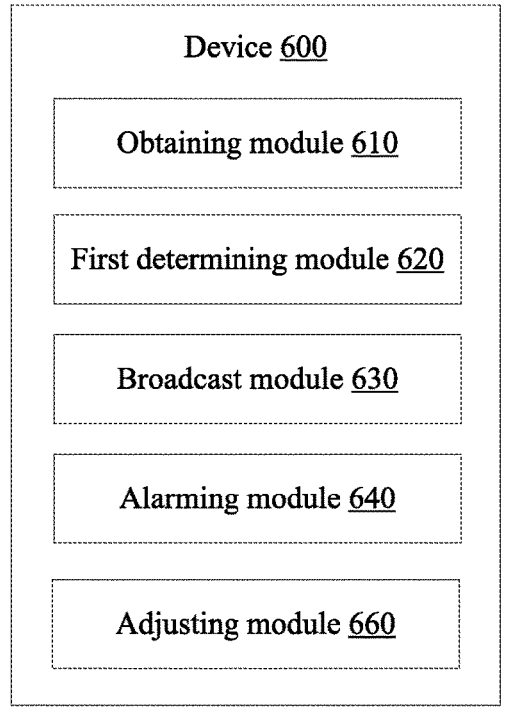
FIG. 8 is a schematic diagram of a modular structure of an alarming device according to another implementation manner of this application.

As shown in FIG. 8, in one embodiment, the device 600 may further include:

an adjusting module 660, configured to adjust the power of the audio signal according to the alarming information.

After receiving the alarming information, the user generally intends to turn off, and/or lower the audio signal, so as to help the user obtain information about an external sound in time. By setting the adjusting module 660, operation of such behaviors of the user may be omitted, and operation time of the user in response to the alarming information may be reduced, so that the user has time and capacity to dodge a risk in time.

An application scenario of the alarming method and device of the embodiments of this application may be as follows: a user A walks on a road while wearing an earphone to listen to music played by a smartphone, and when the user A increases the volume to 60 dB, the smartphone determines a transmit power value according to the current volume, the moving state of the user A, and the environment information, and broadcasts detection information including the transmit power value to the periphery at the transmit power value; a smartphone of a user B driving to pass through this place near user A receives the detection information, and performs calculation according to the detection information to obtain that a distance between the user B and the user A is less than 5 meters, and a risk of colliding with the user A exists, and therefore the smartphone of the user B transmits alarming information to the smartphone of the user A; after receiving the alarming information, the smartphone of the user A alarms the user A by using both vibration and text, and automatically turns off music playback, and the user A pays attention to a vehicle of the user B in time, thereby avoiding being bumped and injured.

Figure 9:
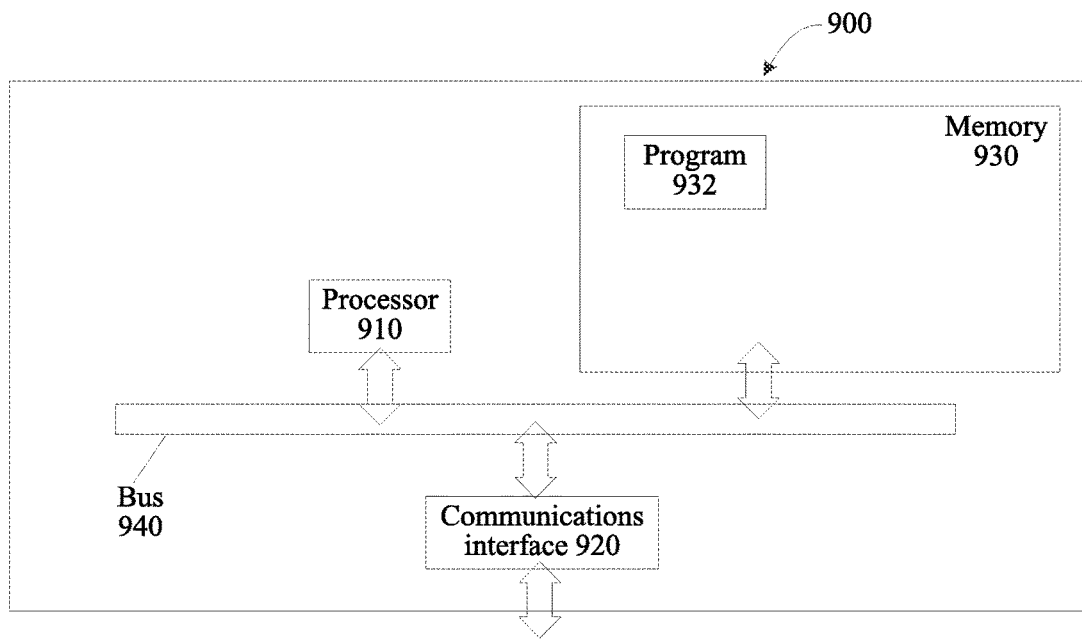
FIG. 9 is a schematic diagram of a hardware structure of an alarming device according to an embodiment of this application.

A hardware structure of an alarming device according to an embodiment of this application is shown in FIG. 9. Exemplary embodiments of the alarming device is not limited to a specific embodiment of this application. As shown in FIG. 9, the apparatus 900 may include:

a processor 910, a communications interface 920, a memory 930, and a communications bus 940.

The processor 910, the communications interface 920, and the memory 930 communicate with each other through the communications bus 940.

The communications interface 920 is configured to communicate with another network element.

The processor 910 is configured to execute a program 932, and may specifically execute related steps in the embodiments shown in FIG. 1.

Specifically, the program 932 may include program code, where the program code includes a computer operation instruction.

The processor 910 may be a central processing unit CPU, or an application specific integrated circuit ASIC (Application Specific Integrated Circuit), or one or more integrated circuits that are configured to implement the embodiment of this application.

The memory 930 is configured to store the program 932. The memory 930 may include a high-speed RAM memory, and may further include a non-volatile memory (non-volatile memory), for example, at least one disk memory. The program 932, for example, may perform the following steps:

obtaining a power of an audio signal; determining a transmit power value at least according to the power of the audio signal; broadcasting detection information according to the transmit power value, the detection information including the transmit power value; and alarming, in response to receiving alarming information fed back by another device according to the detection information, a user according to the alarming information.

For specific implementation of steps in the program 932, reference may be made to related steps or modules in the foregoing embodiments, which are not described here. It can be clearly understood by persons skilled in the art that, for the purpose of convenient and brief description, as for a specific working process of the foregoing device and module, reference can be made to the corresponding process in the foregoing embodiments, and the details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the art, or part of the technical solutions may be implemented in the form of a software product. The computer software product is stored in a storage medium, and includes several instructions for instructing a computer device (which may be a personal computer, a controller, a network device, or the like) to perform all or a part of the steps of the method described in the embodiment of this application. The foregoing storage medium may include: any medium that can store program code, such as a USB flash drive, a removable hard disk, a read-only memory (ROM, Read-Only Memory), a random access memory (RAM, Random Access Memory), a magnetic disk, or an optical disc.

The foregoing exemplary embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. An alarming method, comprising:
   obtaining, at an alarming device, a power of an audio signal from an audio output device;
   determining a transmit power value at least according to the power of the audio signal;
   broadcasting, to another device, detection information according to the transmit power value, the detection information comprising the transmit power value; and
   alarming, in response to receiving alarming information fed back by the another device according to the detection information, a user of the alarming device according to the alarming information.

2. The method of claim 1, wherein the transmit power value is in direct proportion to the power of the audio signal.

3. The method of claim 1, wherein the determining a transmit power value at least according to the power of the audio signal comprises:
   determining the transmit power value according to the power of the audio signal and a moving state of the user.

4. The method of claim 1, wherein the determining a transmit power value at least according to the power of the audio signal comprises:
   determining the transmit power value according to the power of the audio signal and environment information.

5. The method of claim 1, wherein the determining a transmit power value at least according to the power of the audio signal comprises:
   determining, in response to that the power of the audio signal is greater than a first threshold, the transmit power value at least according to the power of the audio signal.

6. The method of claim 1, wherein the detection information further comprises location information of the user and/or the moving state of the user.

7. The method of claim 1, further comprising:
   determining a threshold at least according to the power of the audio signal.

8. The method of claim 7, wherein the detection information further comprises the threshold.

9. The method of claim 7, wherein the threshold is a reference power value or a reference distance value.

10. The method of claim 1, wherein the alarming information comprises location information of the another device and/or a moving state of the another device.

11. The method of claim 1, further comprising:
    adjusting the power of the audio signal according to the alarming information.

12. An alarming device, comprising:
    an obtaining module, configured to obtain a power of an audio signal from an audio output device;
    a first determining module, configured to determine a transmit power value at least according to the power of the audio signal;
    a broadcast module, configured to broadcast detection information to another device according to the transmit power value, the detection information comprising the transmit power value; and
    an alarming module, configured to alarm, in response to receiving alarming information fed back by the another device according to the detection information, a user of the alarming device according to the alarming information.

13. The alarming device of claim 12, wherein the first determining module is configured to determine the transmit power value according to the power of the audio signal and a moving state of the user.

14. The alarming device of claim 12, wherein the first determining module is configured to determine the transmit power value according to the power of the audio signal and environment information.

15. The alarming device of claim 12, wherein the first determining module is configured to determine, in response to that the power of the audio signal is greater than a first threshold, the transmit power value at least according to the power of the audio signal.

16. The alarming device of claim 12, further comprising:
    a second determining module, configured to determine a threshold at least according to the power of the audio signal.

17. The alarming device of claim 12, further comprising:
    an adjusting module, configured to adjust the power of the audio signal according to the alarming information.

18. The alarming device of claim 12, wherein the alarming device is an audio playing device.

19. An alarming device, comprising at least one executable instruction, which, in response to execution, causes the alarming device comprising at least one processor to perform operations, comprising:
    obtaining, at an alarming device, a power of an audio signal from an audio output device;
    determining a transmit power value at least according to the power of the audio signal;
    broadcasting, to another device, detection information according to the transmit power value, the detection information comprising the transmit power value; and
    alarming, in response to receiving alarming information fed back by the another device according to the detection information, a user of the alarming device according to the alarming information.

20. An alarming device, comprising a processor and a memory, the memory storing computer executable instructions, the processor being connected to the memory through a communication bus, wherein when the device operates, the processor executes the computer executable instructions stored in the memory, causing the device to execute operations, comprising:
    obtaining, at an alarming device, a power of an audio signal from an audio output device;
    determining a transmit power value at least according to the power of the audio signal;
    broadcasting, to another device, detection information according to the transmit power value, the detection information comprising the transmit power value; and
    alarming, in response to receiving alarming information fed back by the another device according to the detection information, a user of the alarming device according to the alarming information.

* * * * *